US012725566B2

(12) United States Patent
Lim et al.

(10) Patent No.: US 12,725,566 B2
(45) Date of Patent: Sep. 1, 2026

(54) GATE DRIVER WITH LOW POWER CONSUMPTION, DISPLAY DEVICE INCLUDING THE GATE DRIVER AND ELECTRONIC APPARATUS INCLUDING THE DISPLAY DEVICE

(71) Applicant: Samsung Display Co., LTD., Yongin-si (KR)

(72) Inventors: Jaekeun Lim, Yongin-si (KR); Seongheon Cho, Yongin-si (KR); Hae-Kwan Seo, Yongin-si (KR); Jin-Wook Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/056,262

(22) Filed: Feb. 18, 2025

(65) Prior Publication Data

US 2025/0384814 A1 Dec. 18, 2025

(30) Foreign Application Priority Data

Jun. 18, 2024 (KR) ........................ 10-2024-0078631

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2300/0838* (2013.01); *G09G 2310/0267* (2013.01); *G09G 2310/0275* (2013.01); *G09G 2310/0297* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2008/0170029 A1* 7/2008 Kim ........................ G11C 19/28 345/100
2018/0190204 A1 7/2018 Shin et al.
2019/0378458 A1 12/2019 Lee et al.
2021/0065632 A1 3/2021 Kim et al.
2022/0343854 A1* 10/2022 Li ........................ H10D 86/421
2023/0037917 A1* 2/2023 Xu ........................ G11C 19/28
2023/0351935 A1 11/2023 Kim et al.
2023/0351972 A1 11/2023 In et al.
2024/0021165 A1 1/2024 Kang et al.
2024/0062723 A1 2/2024 Roh et al.
2025/0322781 A1* 10/2025 Lim ..................... G09G 3/3677

FOREIGN PATENT DOCUMENTS

KR 10-2022-0161903 12/2022

* cited by examiner

*Primary Examiner* — Donna V Bocar
(74) *Attorney, Agent, or Firm* — Womble Bond Dickinson (US) LLP

(57) ABSTRACT

A gate driver includes a first transistor configured to transmit an input signal to a control node in response to a first clock signal swinging between a first low gate voltage and a high gate voltage, a sixth transistor configured to output the high gate voltage as a gate signal to an output terminal in response to a signal of an inverting control node, and a seventh transistor configured to output a second clock signal swinging between a second low gate voltage, which has a level that is higher than a level of the first low gate voltage, and the high gate voltage as the gate signal to the output terminal in response to a signal of the control node.

20 Claims, 17 Drawing Sheets

GATE DRIVER WITH LOW POWER CONSUMPTION, DISPLAY DEVICE INCLUDING THE GATE DRIVER AND ELECTRONIC APPARATUS INCLUDING THE DISPLAY DEVICE

CROSS-REFERENCE TO RELATED APPLICATION

The present application claims priority to, and the benefit of, Korean Patent Application No. 10-2024-0078631, filed on Jun. 18, 2024, in the Korean Intellectual Property Office, the entire disclosure of which is incorporated herein by reference.

BACKGROUND

1. Field

Embodiments relate to a gate driver with low power consumption, a display device including the gate driver, and an electronic apparatus including the display device.

2. Description of the Related Art

A display device may include a display panel for displaying an image, a gate driver for providing gate signals to the display panel, and a data driver for providing data voltages to the display panel. The gate driver may include transistors and capacitors for generating the gate signals.

At least one clock signal may be applied to the gate driver. When the amplitude of the clock signal, which is applied to a buffer transistor that outputs the gate signal among the transistors included in the gate driver, increases, power consumption of the gate driver may increase.

SUMMARY

Embodiments provide a gate driver in which power consumption is reduced.

Embodiments provide a display device including a gate driver in which power consumption is reduced, and an electronic apparatus including the display device.

A gate driver according to embodiments includes a first transistor configured to transmit an input signal to a control node in response to a first clock signal swinging between a first low gate voltage and a high gate voltage, a sixth transistor configured to output the high gate voltage as a gate signal to an output terminal in response to a signal of an inverting control node, and a seventh transistor configured to output a second clock signal swinging between a second low gate voltage, which has a level that is higher than a level of the first low gate voltage, and the high gate voltage as the gate signal to the output terminal in response to a signal of the control node.

A phase of the second clock signal may be different from a phase of the first clock signal.

The level of the second low gate voltage may be lower than or equal to about 0 V.

A width of a pulse of the first clock signal having the level of the first low gate voltage may be greater than a width of a pulse of the second clock signal having the level of the second low gate voltage.

The gate driver may further include a second transistor including a gate connected to the inverting control node, a first terminal configured to receive the high gate voltage, and a second terminal, and a third transistor including a gate configured to receive the second clock signal, a first terminal connected to the second terminal of the second transistor, and a second terminal connected to the control node.

The gate driver may further include a fourth transistor configured to transmit the first clock signal to the inverting control node in response to the signal of the control node.

The gate driver may further include a fourth transistor configured to transmit a third clock signal swinging between the second low gate voltage and the high gate voltage to the inverting control node in response to the signal of the control node.

A phase of the third clock signal may be the same as a phase of the first clock signal.

The gate driver may further include a fifth transistor configured to transmit the first low gate voltage to the inverting control node in response to the first clock signal.

The gate driver may further include a first capacitor including a first terminal connected to the output terminal, and a second terminal connected to the control node.

The gate driver may further include a second capacitor including a first terminal connected to the inverting control node, and a second terminal configured to receive the high gate voltage.

The gate driver may further include a first control node an a second control node as the control node, and an eighth transistor including a gate configured to receive the first low gate voltage, a first terminal connected to the first control node, and a second terminal connected to the second control node.

The gate driver may further include a level shifter configured to convert a third clock signal swinging between the second low gate voltage and the high gate voltage into the first clock signal.

The level shifter may include a ninth transistor including a gate configured to receive the third clock signal, a first terminal configured to receive the first low gate voltage, and a second terminal connected to a first node, a tenth transistor including a gate, a first terminal configured to receive the first low gate voltage, and a second terminal connected to a second node configured to output the first clock signal, an eleventh transistor including a gate connected to the second node, a first terminal configured to receive the high gate voltage, and a second terminal connected to the first node, a twelfth transistor including a gate connected to the first node, a first terminal configured to receive the high gate voltage, and a second terminal connected to the second node, and an inverter including a first terminal configured to receive the third clock signal, and a second terminal connected to the gate of the tenth transistor.

A display device according to embodiments includes a display panel including a pixel, a gate driver configured to provide a gate signal to the pixel, and including a first transistor configured to transmit an input signal to a control node in response to a first clock signal swinging between a first low gate voltage and a high gate voltage, a sixth transistor configured to output the high gate voltage as the gate signal to an output terminal in response to a signal of an inverting control node, and a seventh transistor configured to output a second clock signal swinging between a second low gate voltage, which has a level that is higher than a level of the first low gate voltage, and the high gate voltage as the gate signal to the output terminal in response to a signal of the control node, and a data driver configured to provide a data voltage to the pixel.

The display device may further include a demultiplexer configured to selectively connect one channel of the data driver to data lines in the display panel in response to a control signal.

The display device may further include a first level shifter configured to generate the first clock signal based on the first low gate voltage and the high gate voltage, and a second level shifter configured to generate the second clock signal and the control signal based on the second low gate voltage and the high gate voltage.

The pixel may include a light-emitting element, a first pixel transistor configured to control a driving current flowing through the light-emitting element, a second pixel transistor configured to transmit the data voltage to a gate of the first pixel transistor in response to a writing gate signal, a third pixel transistor configured to compensate a threshold voltage of the first pixel transistor in response to a compensation gate signal, a fourth pixel transistor configured to transmit a first initialization voltage to the gate of the first pixel transistor in response to an initialization gate signal, a fifth pixel transistor configured to block a connection between a first terminal of the first pixel transistor and a first power voltage in response to an emission signal, a sixth pixel transistor configured to block a connection between a second terminal of the first pixel transistor and a second power voltage in response to the emission signal, a seventh pixel transistor configured to transmit a second initialization voltage to an anode of the light-emitting element in response to a bypass gate signal, and a storage capacitor configured to store a signal of the gate of the first pixel transistor.

The gate signal may be the writing gate signal.

An electronic apparatus according to embodiments includes a display device configured to display an image, and a processor configured to control the display device, the display device including a display panel including a pixel, a gate driver configured to provide a gate signal to the pixel, and including a first transistor configured to transmit an input signal to a control node in response to a first clock signal swinging between a first low gate voltage and a high gate voltage, a sixth transistor configured to output the high gate voltage as the gate signal to an output terminal in response to a signal of an inverting control node, and a seventh transistor configured to output a second clock signal swinging between a second low gate voltage, which has a level that is higher than a level of the first low gate voltage, and the high gate voltage as the gate signal to the output terminal in response to a signal of the control node, and a data driver configured to provide a data voltage to the pixel.

In the gate driver according to one or more embodiments, the level of the second gate voltage of the second clock signal, which is applied to the seventh transistor that is a buffer transistor for outputting the gate signal, is higher than the level of the first low gate voltage of the first clock signal, so that the amplitude of the second clock signal may decrease. Accordingly, power consumption of the gate driver may be reduced.

The display device according to embodiments includes the gate driver with the reduced power consumption, so that power consumption of the display device may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
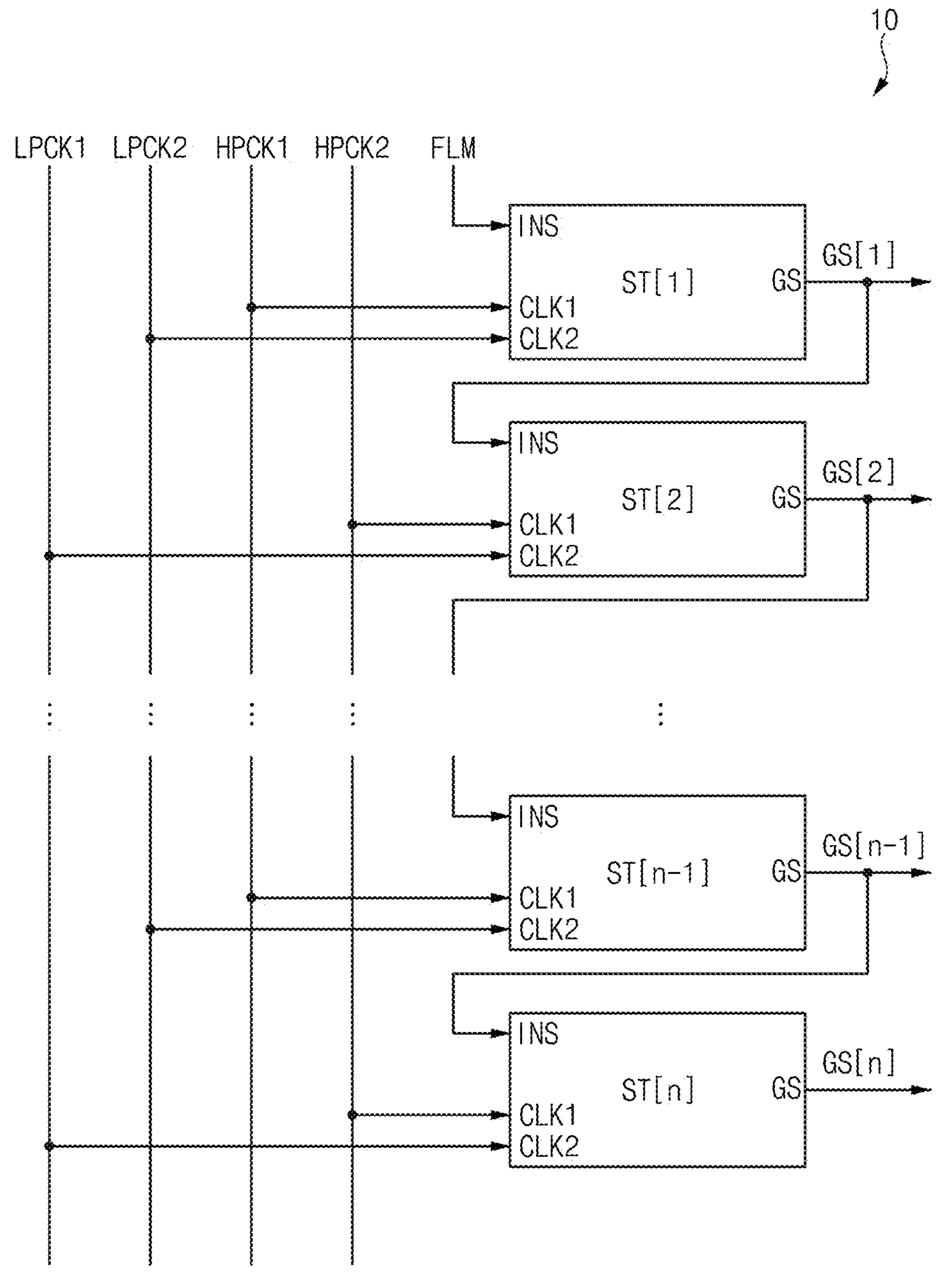
FIG. 1 is a block diagram showing a gate driver according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of “can,” “may,” or “may not” in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being “formed on,” “on,” “connected to,” or “(operatively, functionally, or communicatively) coupled to”

another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a gate driver, a display device, and an electronic apparatus according to embodiments of the present disclosure will be described in more detail with reference to the accompanying drawings.

FIG. 1 is a block diagram showing a gate driver 10 according to one or more embodiments.

Referring to FIG. 1, the gate driver 10 may receive a first high-power clock signal HPCK1, a second high-power clock signal HPCK2, a first low-power clock signal LPCK1, a second low-power clock signal LPCK2, and a gate start signal FLM, and may output first to $n^{th}$ (n is a natural number greater than 1) gate signals GS[1], GS[2], . . . , GS[n−1], and GS[n]. The gate driver 10 may include first to $n^{th}$ stages ST[1], ST[2], . . . , ST[n−1], and ST[n].

Each of the first to $n^{th}$ stages ST[1], ST[2], . . . , ST[n−1], and ST[n] may receive the first high-power clock signal HPCK1 or the second high-power clock signal HPCK2 as a first clock signal CLK1, and may receive the first low-power clock signal LPCK1 or the second low-power clock signal LPCK2 as a second clock signal CLK2. In one or more embodiments, each of odd-numbered stages ST[1], . . . , ST[n−1] may receive the first high-power clock signal HPCK1 and the second low-power clock signal LPCK2 as the first clock signal CLK1 and the second clock signal CLK2, respectively, and each of even-numbered stages ST[2], . . . , ST[n] may receive the second high-power clock signal HPCK2 and the first low-power clock signal LPCK1 as the first clock signal CLK1 and the second clock signal CLK2, respectively. The first stage ST[1] may receive the gate start signal FLM as an input signal INS, and each of the second to $n^{th}$ stages ST[2], . . . , ST[n−1], and ST[n] may receive a gate signal output from a previous stage as the input signal INS. The first to $n^{th}$ stages ST[1], ST[2], . . . , ST[n−1], and ST[n] may output the first to $n^{th}$ gate signals GS[1], GS[2], . . . , GS[n−1], and GS[n], respectively.

Figure 2:
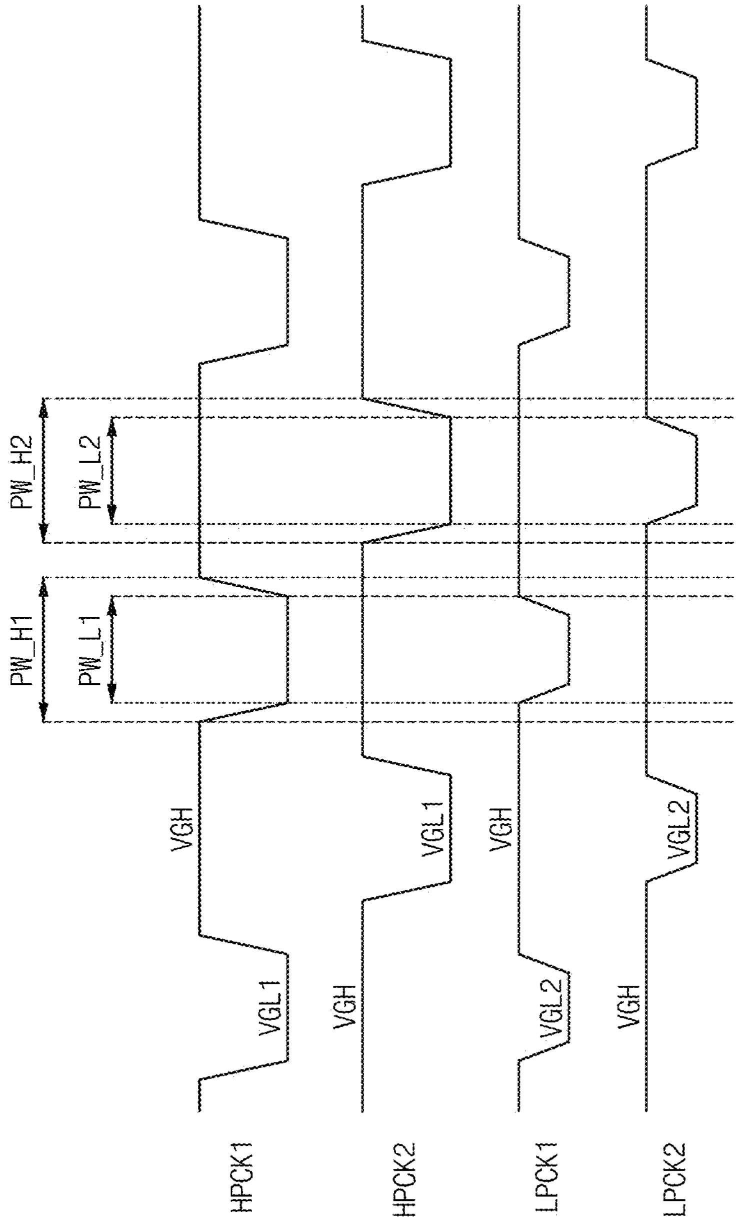
FIG. 2 is a timing diagram showing clock signals of FIG. 1.

FIG. 2 is a timing diagram showing the clock signals HPCK1, HPCK2, LPCK1, and LPCK2 of FIG. 1.

Referring to FIGS. 1 and 2, each of the first high-power clock signal HPCK1 and the second high-power clock signal HPCK2 may swing between a first low gate voltage VGL1 and a high gate voltage VGH. The first low gate voltage VGL1 may be a turn-on voltage of a p-channel metal oxide semiconductor (PMOS) transistor and a turn-off voltage of an n-channel metal oxide semiconductor (NMOS) transistor. For example, a level of the first low gate voltage VGL1 may be about −8 V. The high gate voltage VGH may be a turn-off voltage of the PMOS transistor, and may be a turn-on voltage of the NMOS transistor. For example, a level of the high gate voltage VGH may be about 7 V or about 8 V.

A phase of the second high-power clock signal HPCK2 may be different from a phase of the first high-power clock signal HPCK1. The second high-power clock signal HPCK2 may be a signal in which the first high-power clock signal HPCK1 is shifted by half a period of the first high-power clock signal HPCK1.

Each of the first low-power clock signal LPCK1 and the second low-power clock signal LPCK2 may swing between a second low gate voltage VGL2 and the high gate voltage VGH. The second low gate voltage VGL2 may be a turn-on voltage of the PMOS transistor, and may be a turn-off voltage of the NMOS transistor. A level of the second low gate voltage VGL2 may be higher than the level of the first low gate voltage VGL1. In one or more embodiments, the level of the second low gate voltage VGL2 may be lower than or equal to about 0 V. For example, the level of the second low gate voltage VGL2 may be about −4 V.

A phase of the second low-power clock signal LPCK2 may be different from a phase of the first low-power clock signal LPCK1. The second low-power clock signal LPCK2 may be a signal in which the first low-power clock signal LPCK1 is shifted by half a period of the first low-power clock signal LPCK1.

The phase of the first low-power clock signal LPCK1 may be the same as the phase of the first high-power clock signal HPCK1, and thus, the phase of the first low-power clock signal LPCK1 may be different from the phase of the second high-power clock signal HPCK2. The phase of the second low-power clock signal LPCK2 may be the same as the phase of the second high-power clock signal HPCK2, and thus, the phase of the second low-power clock signal LPCK2 may be different from the phase of the first high-power clock signal HPCK1.

A width PW_H1 of a pulse of the first high-power clock signal HPCK1 having the level of the first low gate voltage VGL1 may be greater than a width PW_L1 of a pulse of the first low-power clock signal LPCK1 having the level of the second low gate voltage VGL2. A width PW_H2 of a pulse of the second high-power clock signal HPCK2 having the level of the first low gate voltage VGL1 may be greater than a width PW_L2 of a pulse of the second low-power clock signal LPCK2 having the level of the second low gate voltage VGL2.

Figure 3:
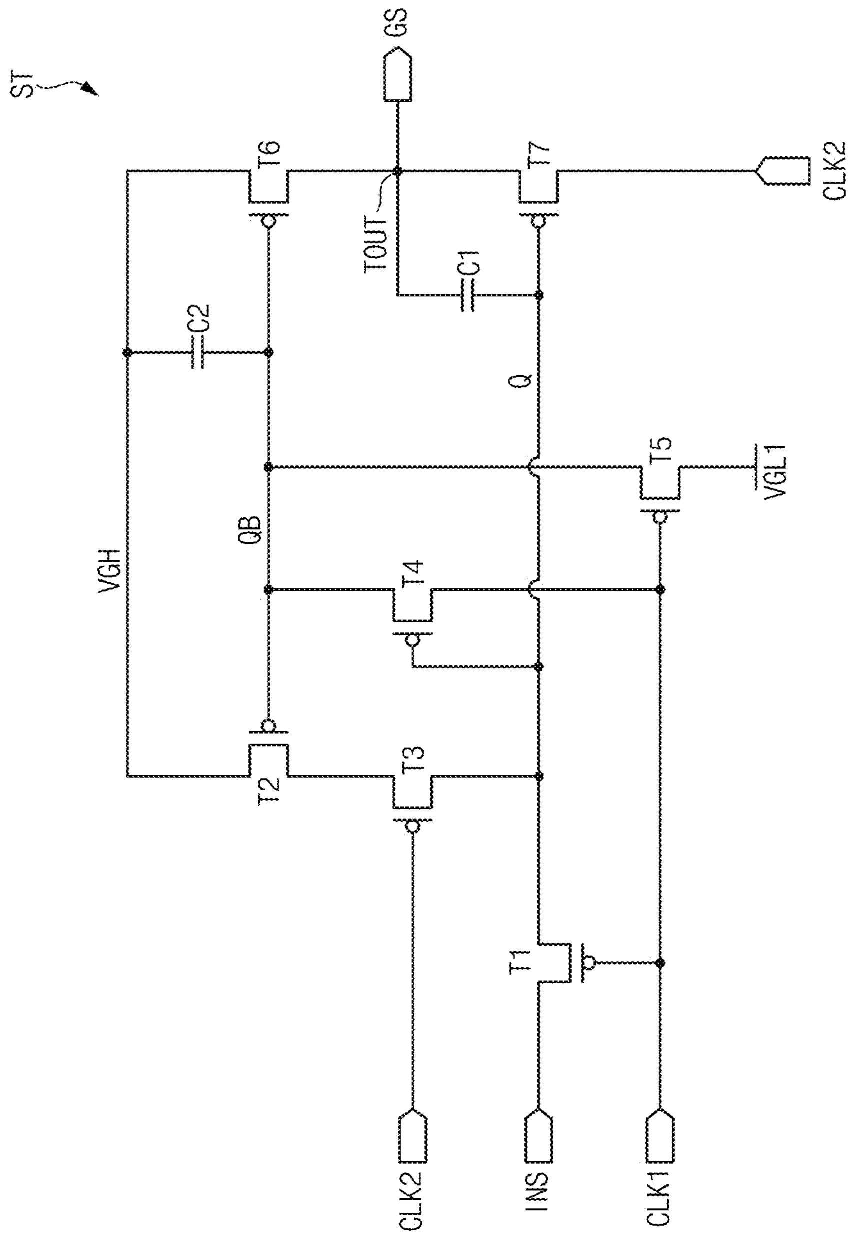
FIG. 3 is a circuit diagram showing an example of a stage of FIG. 1.

FIG. 3 is a circuit diagram showing an example of a stage ST of FIG. 1.

Referring to FIGS. 1 to 3, the stage ST may receive the input signal INS, the first clock signal CLK1, the second clock signal CLK2, the high gate voltage VGH, and the first low gate voltage VGL1, and may output a gate signal GS. When the stage ST is one of the odd-numbered stages ST[1], . . . , ST[n−1], the first clock signal CLK1 may be the first high-power clock signal HPCK1, and the second clock signal CLK2 may be the second low-power clock signal LPCK2. When the stage ST is one of the even-numbered stages ST[2], . . . , ST[n], the first clock signal CLK1 may be the second high-power clock signal HPCK2, and the second clock signal CLK2 may be the first low-power clock signal LPCK1.

The stage ST may include a first transistor T1, a second transistor T2, a third transistor T3, a fourth transistor T4, a fifth transistor T5, a sixth transistor T6, a seventh transistor T7, a first capacitor C1, and a second capacitor C2. However, the number of transistors included in the stage ST and the number of capacitors included in the stage ST are not limited thereto.

The first transistor T1 may transmit the input signal INS to a control node Q in response to the first clock signal CLK1. The first transistor T1 may include a gate that receives the first clock signal CLK1, a first terminal that receives the input signal INS, and a second terminal connected to the control node Q.

The second transistor T2 may include a gate connected to an inverting control node QB, a first terminal that receives the high gate voltage VGH, and a second terminal.

The third transistor T3 may include a gate that receives the second clock signal CLK2, a first terminal connected to the second terminal of the second transistor T2, and a second terminal connected to the control node Q.

The fourth transistor T4 may transmit the first clock signal CLK1 to the inverting control node QB in response to a signal of the control node Q. The fourth transistor T4 may include a gate connected to the control node Q, a first terminal that receives the first clock signal CLK1, and a second terminal connected to the inverting control node QB.

The fifth transistor T5 may transmit the first low voltage VGL1 to the inverting control node QB in response to the first clock signal CLK1. The fifth transistor T5 may include a gate that receives the first clock signal CLK1, a first terminal that receives the first low voltage VGL1, and a second terminal connected to the inverting control node QB.

The sixth transistor T6 may output the high gate voltage VGH as the gate signal GS in response to a signal of the inverting control node QB. The sixth transistor T6 may include a gate connected to the inverting control node QB, a first terminal that receives the high gate voltage VGH, and a second terminal connected to an output terminal TOUT that outputs the gate signal GS. The sixth transistor T6 may be a first buffer transistor that outputs the gate signal GS.

The seventh transistor T7 may output the second clock signal CLK2 as the gate signal GS in response to the signal of the control node Q. The seventh transistor T7 may include a gate connected to the control node Q, a first terminal that receives the second clock signal CLK2, and a second terminal connected to the output terminal TOUT. The seventh transistor T7 may be a second buffer transistor that outputs the gate signal GS.

In one or more embodiments, each of the first transistor T1, the second transistor T2, the third transistor T3, the fourth transistor T4, the fifth transistor T5, the sixth transistor T6, and the seventh transistor T7 may be a PMOS transistor. However, the present disclosure is not limited thereto, and in one or more other embodiments, at least one of the first transistor T1, the second transistor T2, the third transistor T3, the fourth transistor T4, the fifth transistor T5, the sixth transistor T6, or the seventh transistor T7 may be an NMOS transistor.

The first capacitor C1 may store the signal of the control node Q, and may boost the signal of the control node Q in response to a change in the gate signal GS. The first capacitor C1 may include a first terminal connected to the output terminal TOUT and a second terminal connected to the control node Q.

The second capacitor C2 may store the signal of the inverting control node QB. The second capacitor C2 may include a first terminal connected to the inverting control node QB, and a second terminal that receives the high gate voltage VGH.

Figure 4:
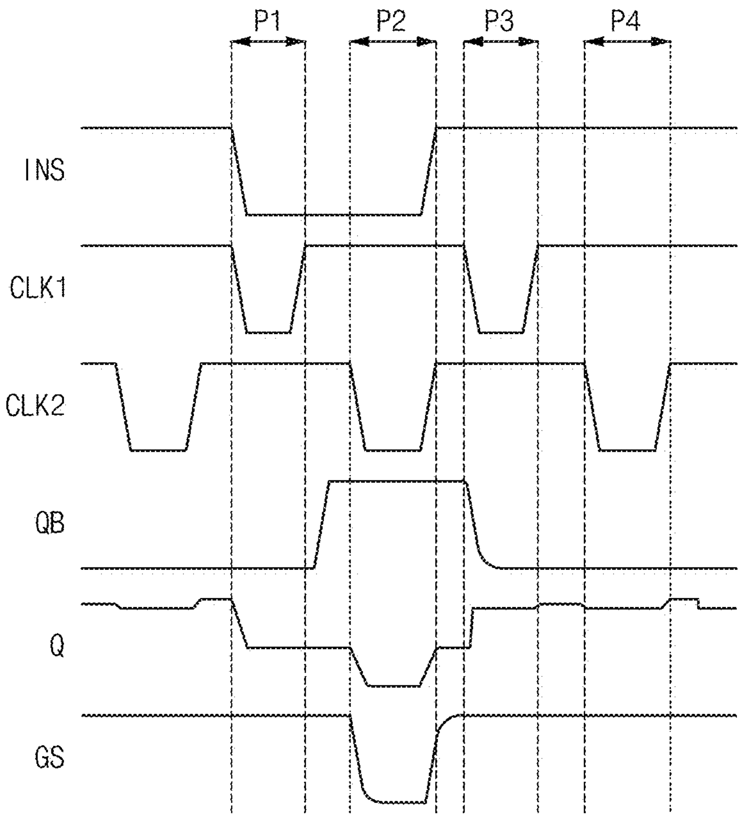
FIG. 4 is a timing diagram showing signals of the stage of FIG. 3.

FIG. 4 is a timing diagram showing signals of the stage ST of FIG. 3. FIGS. 5 to 8 are views showing an operation of the stage ST of FIG. 3.

Figure 5:
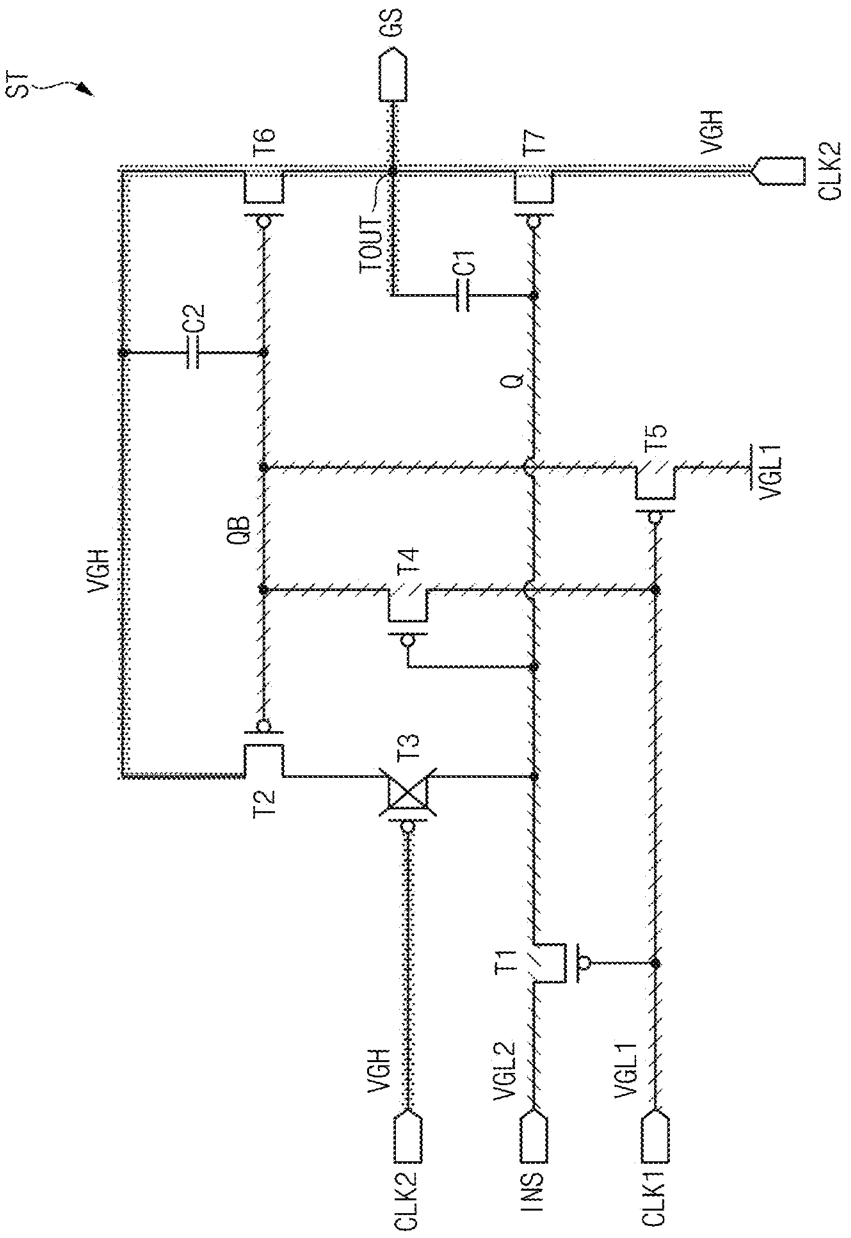
FIGS. 5 to 8 are views showing an operation of the stage of FIG. 3.

Referring to FIGS. 4 and 5, the control node Q may be pre-charged in a first period P1. In the first period P1, the first transistor T1 may be turned on to apply the second low gate voltage VGL2 to the control node Q, and the fourth transistor T4 and the fifth transistor T5 may be turned on to apply the first low gate voltage VGL1 to the inverting control node QB. Accordingly, the sixth transistor T6 and the seventh transistor T7 may be turned on in the first period P1 to output the gate signal GS having the high gate voltage VGH.

Figure 6:
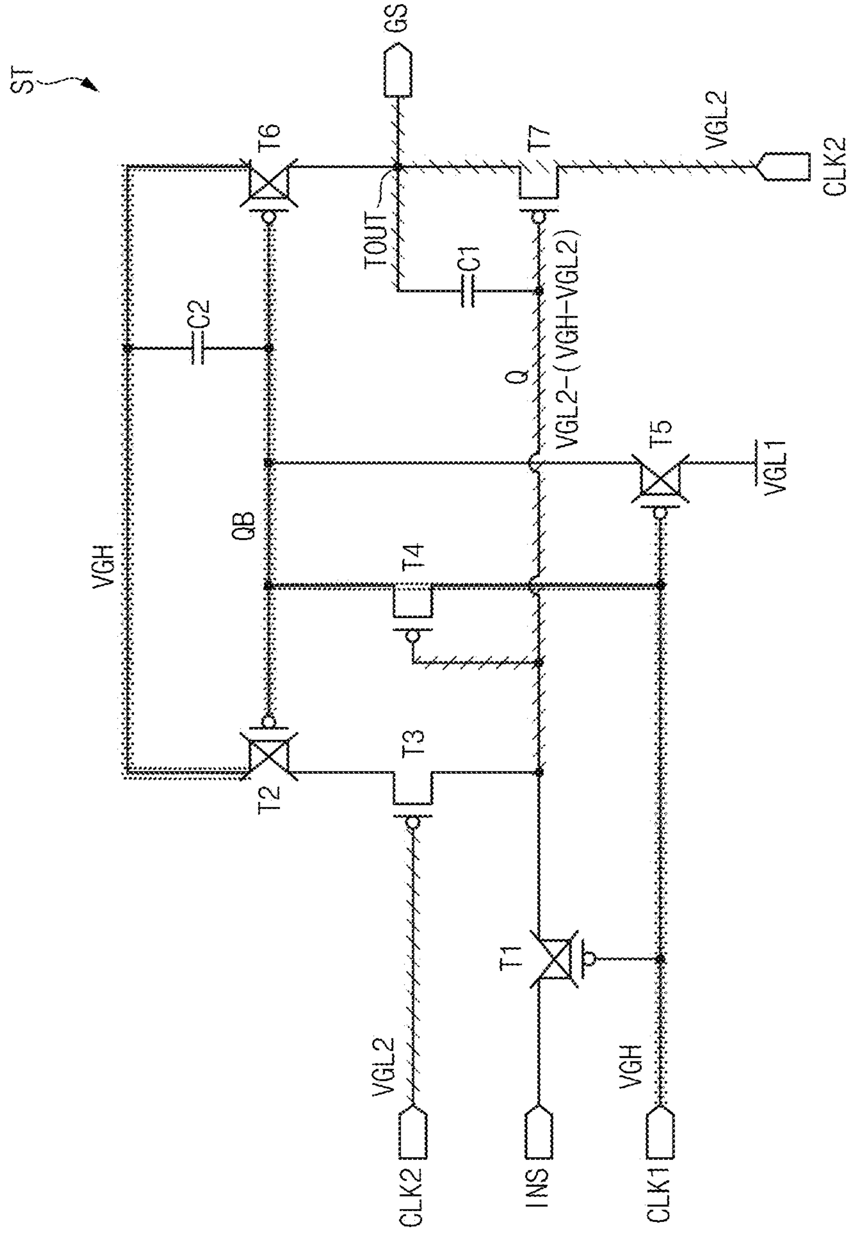

Referring to FIGS. 4 and 6, the signal of the control node Q may be boosted in a second period P2. In the second period P2, the signal of the control node Q may maintain at the second low gate voltage VGL2 by the first capacitor C1, and the fourth transistor T4 may be turned on to apply the high gate voltage VGH to the inverting control node QB. Accordingly, in the second period P2, the sixth transistor T6 may be turned off, and the seventh transistor T7 may be turned on to output the gate signal GS having the second low gate voltage VGL2. In the second period P2, the gate signal GS may change from the high gate voltage VGH to the second low gate voltage VGL2, and the signal of the control node Q may be boosted in proportion to a difference between the second low gate voltage VGL2 and the high gate voltage VGH by the first capacitor C1. Accordingly, in the second period P2, a voltage (for example, VGL2−(VGH−VGL2)) that is lower than the level of the second low gate voltage VGL2 may be applied to the control node Q.

Figure 7:
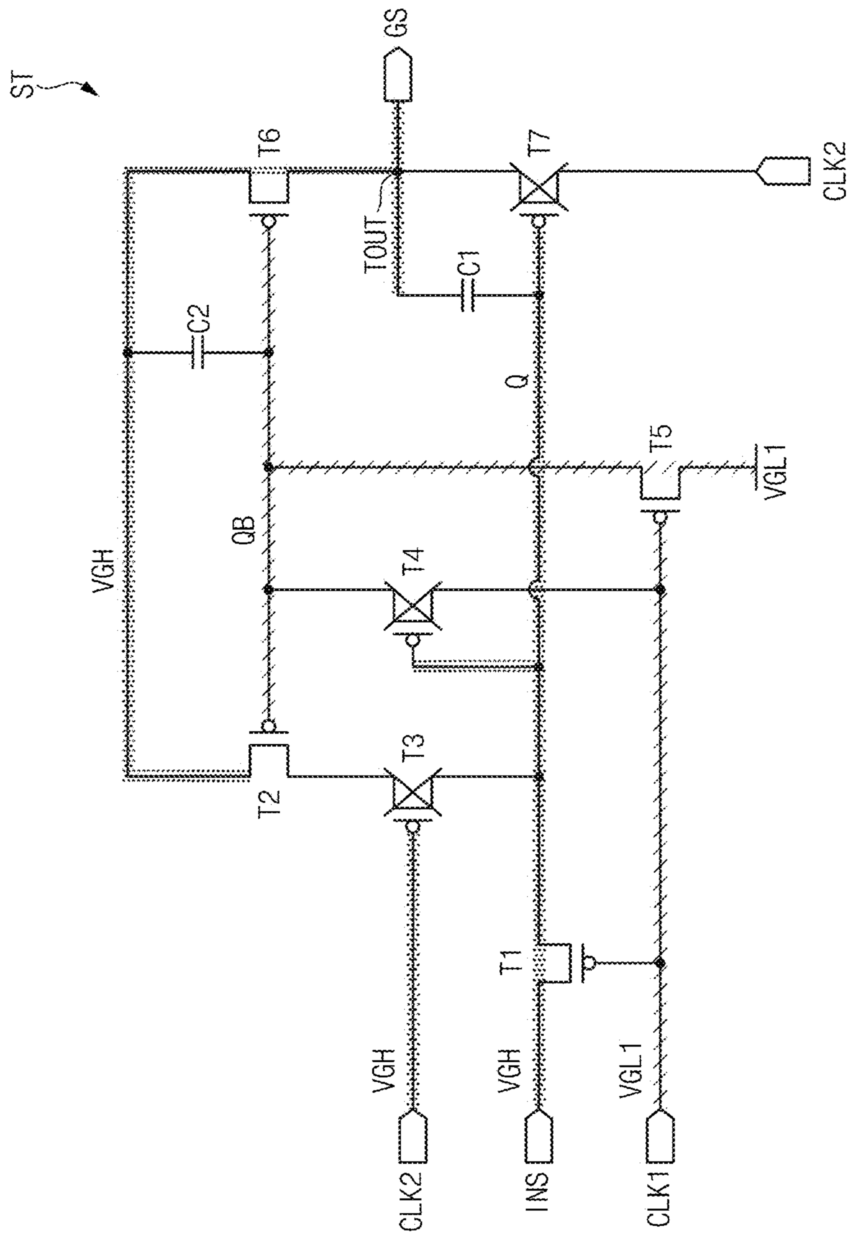

Referring to FIGS. 4 and 7, in a third period P3, the control node Q may be discharged to pull up the gate signal GS. In the third period P3, the first transistor T1 may be turned on to apply the high gate voltage VGH to the control node Q, and the fifth transistor T5 may be turned on to apply the first low gate voltage VGL1 to the inverting control node QB. Accordingly, in the third period P3, the sixth transistor T6 may be turned on, and the seventh transistor T7 may be turned off, to output the gate signal GS having the high gate voltage VGH.

Figure 8:
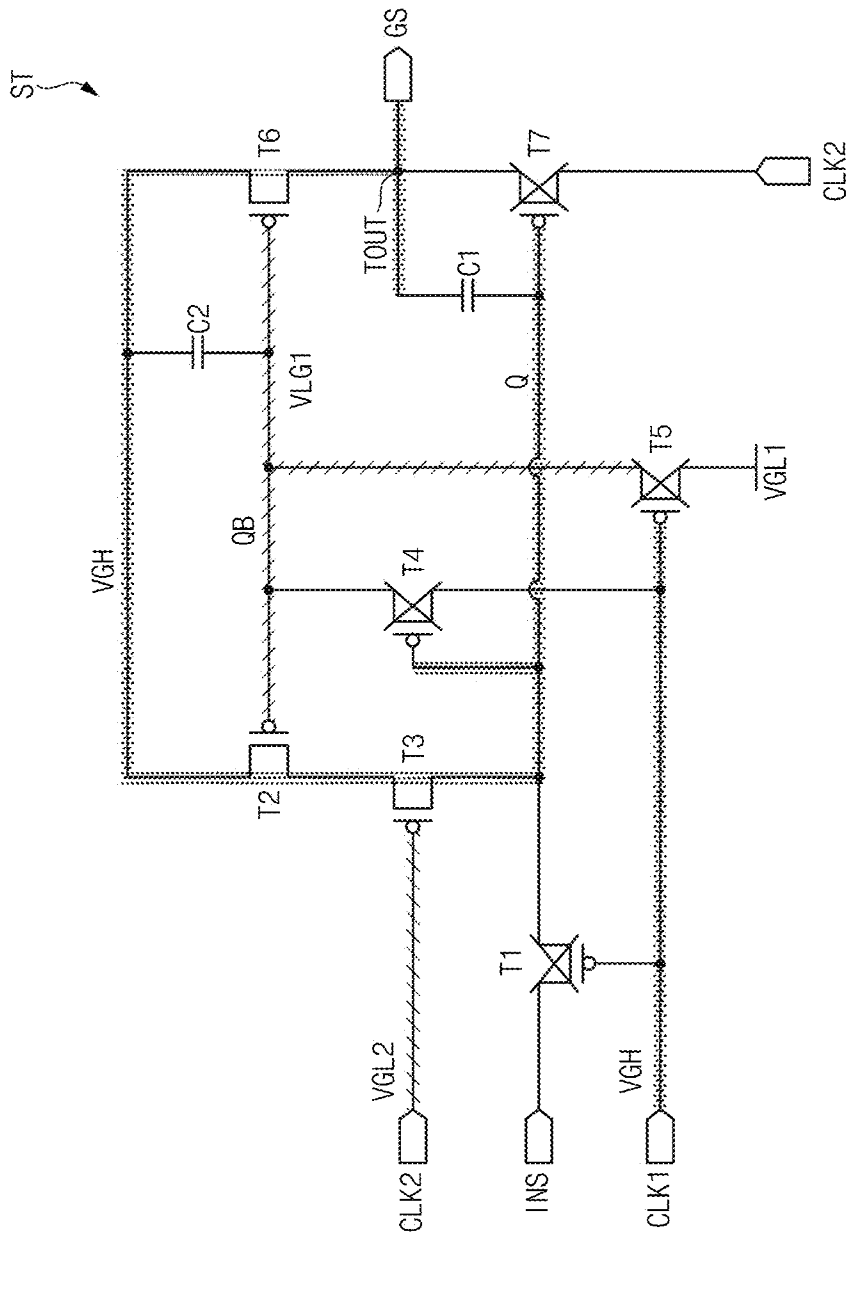

Referring to FIGS. 4 and 8, in a fourth period P4, the control node Q may be discharged so that the gate signal GS may be pulled up. In the fourth period P4, the second transistor T2 and the third transistor T3 may be turned on so that the high gate voltage VGH may be applied to the control node Q, and the signal of the inverting control node QB may maintain at the first low gate voltage VGL1 by the second capacitor C2. Accordingly, in the fourth period P4, the sixth transistor T6 may be turned on, and the seventh transistor T7 may be turned off, so that the gate signal GS having the high gate voltage VGH may be output.

Because the level of the second low gate voltage VGL2 of the second clock signal CLK2 applied to the first terminal of the seventh transistor T7, which is a buffer transistor for outputting the gate signal GS, is higher than the level of the first low gate voltage VGL1 of the first clock signal CLK1 applied to the gate of the first transistor T1 and the gate of the fifth transistor T5, the second clock signal CLK2 may have a relatively small amplitude. Accordingly, power consumption of the gate driver 10 may be reduced. Further, because the first clock signal CLK1 has a relatively large amplitude, reliability of the gate driver 10 may be improved.

Figure 9:
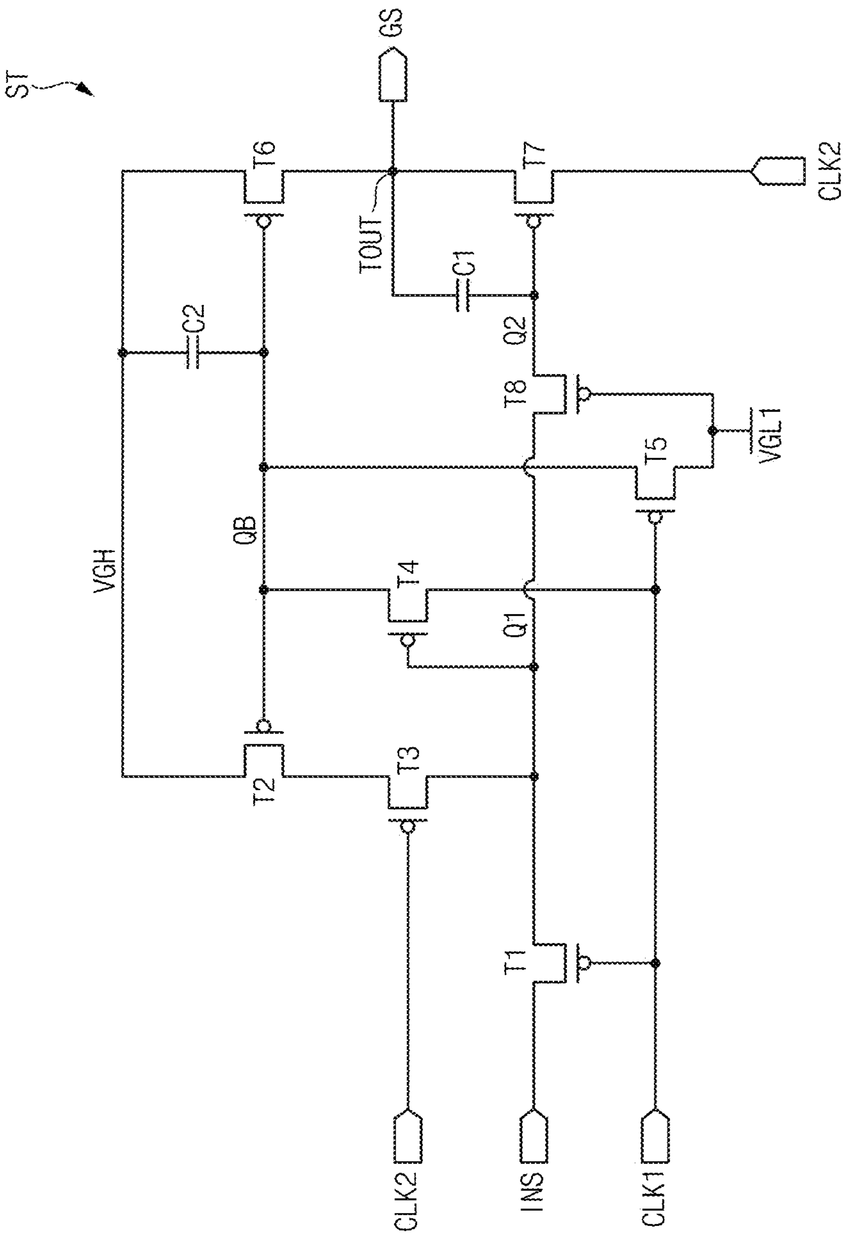
FIG. 9 is a circuit diagram showing an example of the stage of FIG. 1.

FIG. 9 is a circuit diagram showing an example of the stage ST of FIG. 1.

Descriptions of components of the stage ST described with reference to FIG. 9, which are substantially the same as or similar to those of the stage ST described with reference to FIG. 3, are omitted.

Referring to FIG. 9, the stage ST may include a first transistor T1, a second transistor T2, a third transistor T3, a fourth transistor T4, a fifth transistor T5, a sixth transistor T6, a seventh transistor T7, an eighth transistor T8, a first capacitor C1, and a second capacitor C2.

The control node Q of FIG. 3 may be divided into a first control node Q1 and a second control node Q2. The second terminal of the first transistor T1, the second terminal of the third transistor T3, and the gate of the fourth transistor T4 may be connected to the first control node Q1. The gate of the seventh transistor T7 and the second terminal of the first capacitor C1 may be connected to the second control node Q2. The eighth transistor T8 may include a gate that receives the first low gate voltage VGL1, a first terminal connected to the first control node Q1, and a second terminal connected to the second control node Q2. The eighth transistor T8 may be an always on transistor (AOT).

Figure 10:
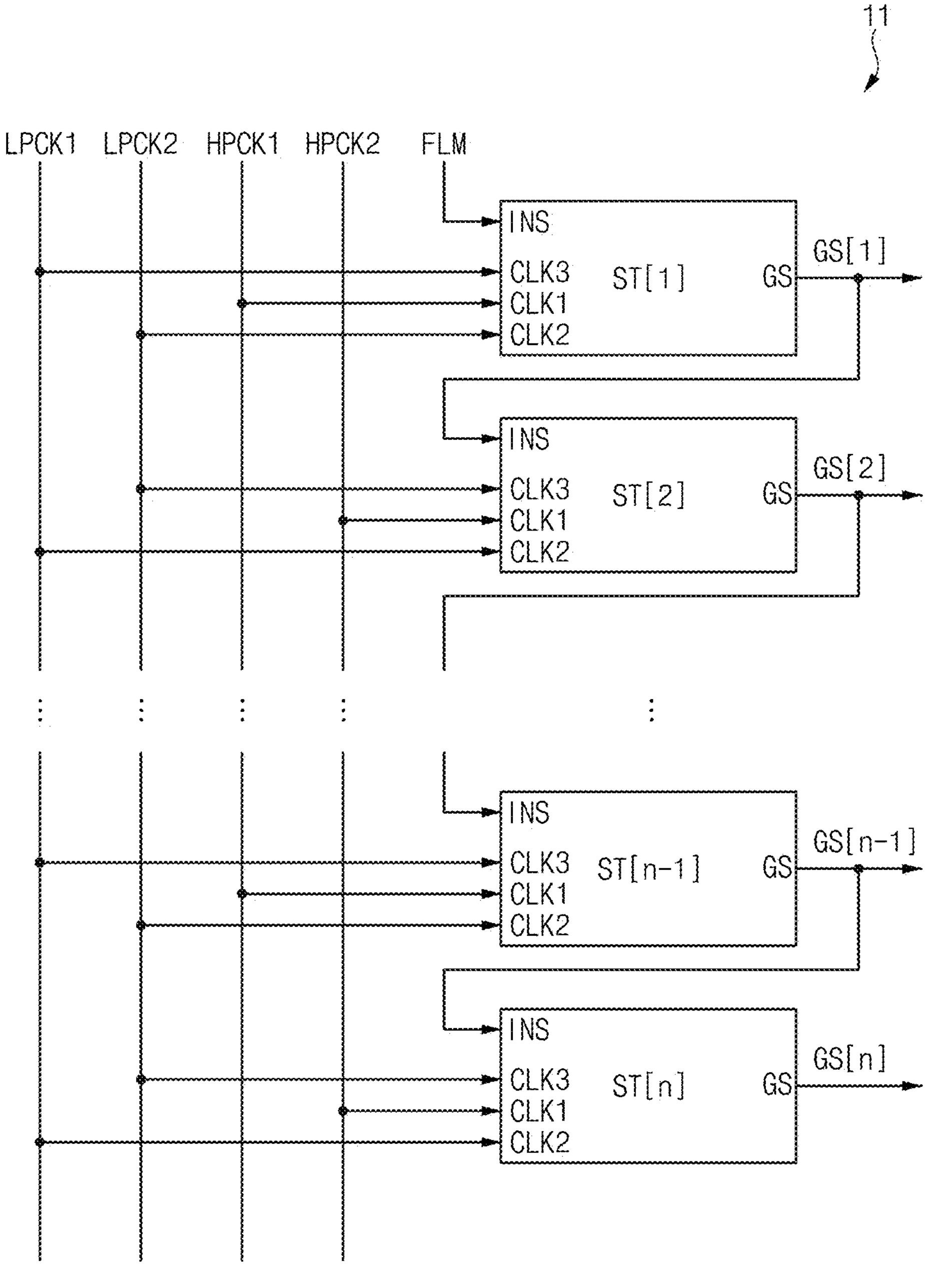
FIG. 10 is a block diagram showing a gate driver according to one or more embodiments.

FIG. 10 is a block diagram showing a gate driver 11 according to one or more embodiments.

Descriptions of components of the gate driver 11 described with reference to FIG. 10, which are substantially the same as or similar to those of the gate driver 10 described with reference to FIGS. 1 and 2, are omitted.

Referring to FIG. 10, the gate driver 11 may include first to $n^{th}$ stages ST[1], ST[2], . . . , ST[n−1], and ST[n]. Each of the first to $n^{th}$ stages ST[1], ST[2], . . . , ST[n−1], and ST[n] may receive a first high-power clock signal HPCK1 or a second high-power clock signal HPCK2 as a first clock signal CLK1, a first low-power clock signal LPCK1 or a second low-power clock signal LPCK2 as a second clock signal CLK2, and the first low-power clock signal LPCK1 or the second low-power clock signal LPCK2 as a third clock signal CLK3. In one or more embodiments, each of odd-numbered stages ST[1], . . . , ST[n−1] may receive the first high-power clock signal HPCK1, the second low-power clock signal LPCK2, and the first low-power clock signal LPCK1 as the first clock signal CLK1, the second clock signal CLK2, and the third clock signal CLK3, respectively, and each of the even-numbered stages ST[2], . . . , ST[n] may receive the second high-power clock signal HPCK2, the first low-power clock signal LPCK1, and the second low-power clock signal LPCK2 as the first clock signal CLK1, the second clock signal CLK2, and the third clock signal CLK3, respectively.

Figure 11:
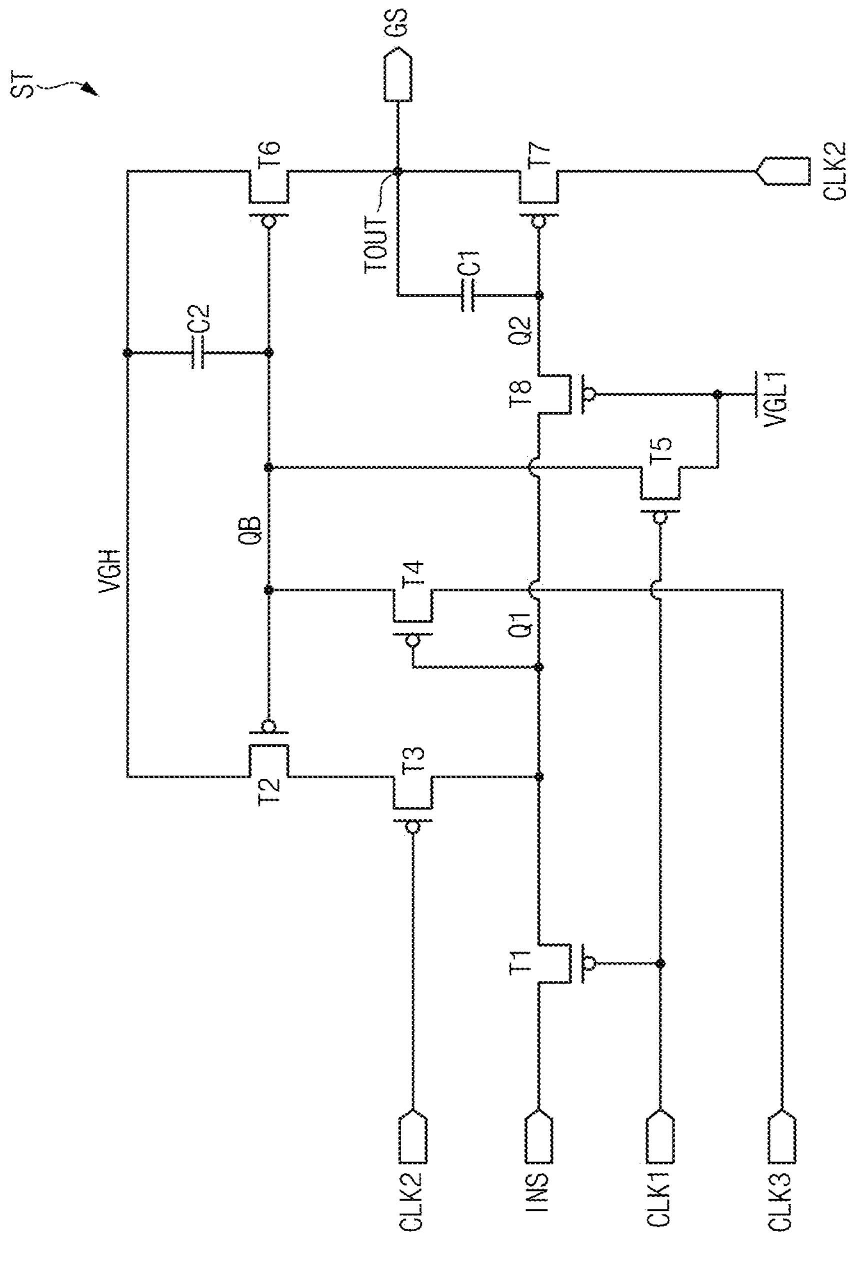
FIG. 11 is a circuit diagram showing an example of a stage of FIG. 10.

FIG. 11 is a circuit diagram showing an example of a stage ST of FIG. 10.

Descriptions of components of the stage ST described with reference to FIG. 11, which are substantially the same as or similar to those of the stage ST described with reference to FIGS. 3 and 9, are omitted.

Referring to FIG. 11, the stage ST may receive an input signal INS, the first clock signal CLK1, the second clock signal CLK2, the third clock signal CLK3, a high gate voltage VGH, and a first low gate voltage VGL1, and may output a gate signal GS. When the stage ST is one of the odd-numbered stages ST[1], . . . , ST[n−1], the third clock signal CLK3 may be the first low-power clock signal LPCK1. When the stage ST is one of the even-numbered stages ST[2], . . . , ST[n], the third clock signal CLK3 may be the second low-power clock signal LPCK2.

The stage ST may include a first transistor T1, a second transistor T2, a third transistor T3, a fourth transistor T4, a fifth transistor T5, a sixth transistor T6, a seventh transistor T7, an eighth transistor T8, a first capacitor C1, and a second capacitor C2.

The fourth transistor T4 may transmit the third clock signal CLK3 to the inverting control node QB in response to a signal of the first control node Q1. The fourth transistor T4 may include a gate connected to the first control node Q1, a first terminal that receives the third clock signal CLK3, and a second terminal connected to the inverting control node QB.

Because the level of the second low gate voltage VGL2 of the third clock signal CLK3 applied to the first terminal of the fourth transistor T4 is higher than the level of the first low gate voltage VGL1 of the first clock signal CLK1 applied to the gate of the first transistor T1 and the gate of the fifth transistor T5, the third clock signal CLK3 may have a relatively small amplitude. Accordingly, power consumption of the gate driver 11 may be reduced.

Figure 12:
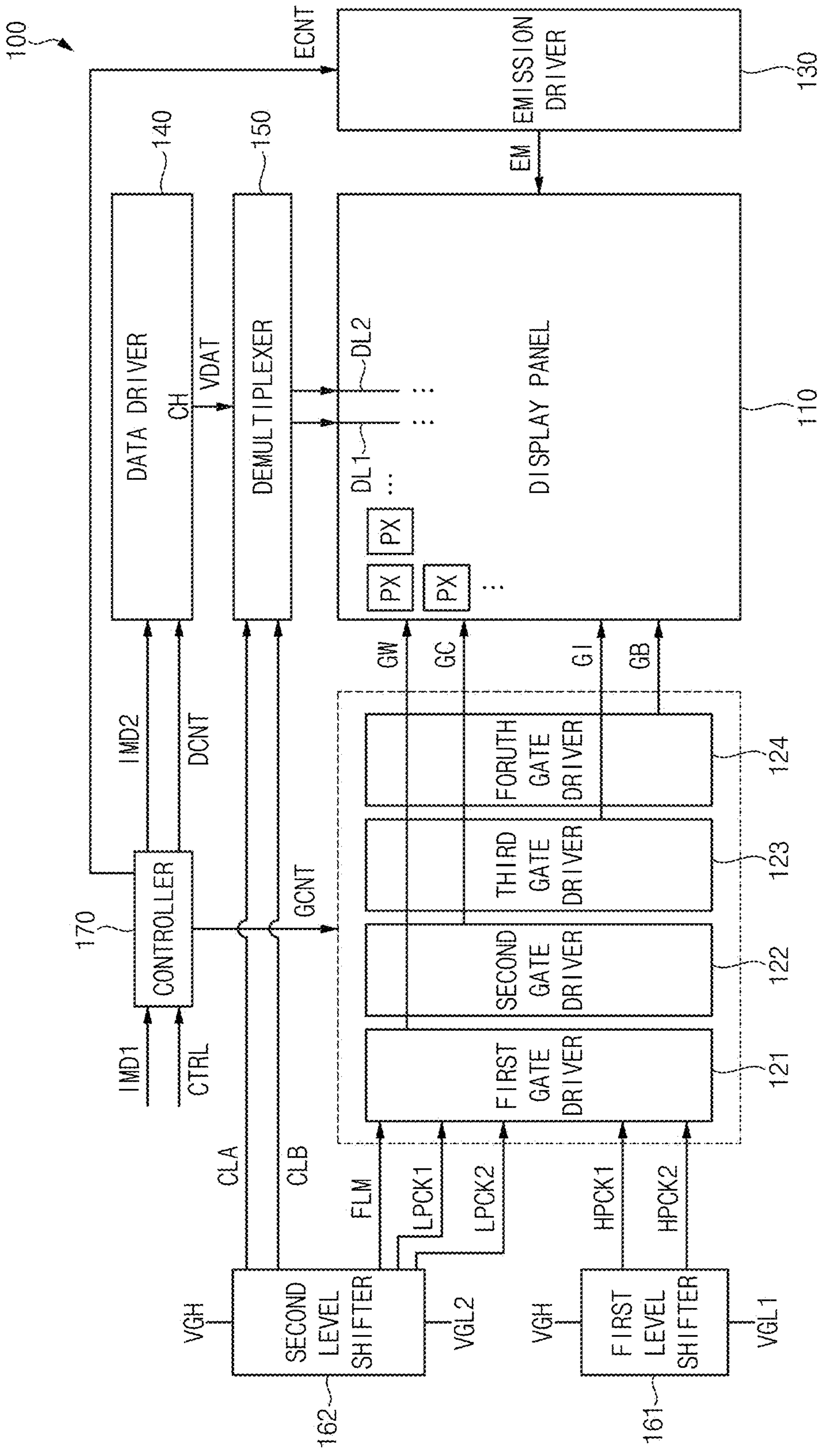
FIG. 12 is a block diagram showing a display device according to one or more embodiments.

FIG. 12 is a block diagram showing a display device 100 according to one or more embodiments.

Referring to FIG. 12, the display device 100 may include a display panel 110, a first gate driver 121, a second gate driver 122, a third gate driver 123, a fourth gate driver 124, an emission driver 130, a data driver 140, a demultiplexer 150, a first level shifter 161, a second level shifter 162, and a controller 170.

The display panel 110 may include pixels PX. Each of the pixels PX may emit light based on a writing gate signal GW, a compensation gate signal GC, an initialization gate signal GI, a bypass gate signal GB, an emission signal EM, and a data voltage VDAT.

The first gate driver 121 may provide the writing gate signal GW to each of the pixels PX. The second gate driver 122 may provide the compensation gate signal GC to each of the pixels PX. The third gate driver 123 may provide the initialization gate signal GI to each of the pixels PX. The fourth gate driver 124 may provide the bypass gate signal GB to each of the pixels PX. The first to fourth gate drivers 121, 122, 123, and 124 may generate the writing gate signal GW, the compensation gate signal GW, the initialization gate signal GI, and the bypass gate signal GB based on a gate control signal GCNT.

In one or more embodiments, the gate driver 10 of FIG. 1 and the gate driver 11 of FIG. 10 may correspond to the first gate driver 121.

The emission driver 130 may provide the emission signal EM to each of the pixels PX. The emission driver 130 may generate the emission signal EM based on an emission control signal ECNT. The emission control signal ECNT may include an emission start signal, an emission clock signal, etc.

The data driver 140 may provide the data voltage VDAT to each of the pixels PX. The data driver 140 may generate the data voltage VDAT based on second image data IMD2 and a data control signal DCNT. The data control signal DCNT may include an output data enable signal, a horizontal start signal, a load signal, etc.

The demultiplexer 150 may selectively connect one channel CH of the data driver 140 to a plurality of data lines located in the display panel 110 in response to a first control signal CLA and a second control signal CLB. In one or more embodiments, the demultiplexer 150 may connect a channel CH to a first data line DL1 in response to the first control signal CLA, and may connect the channel CH to a second data line DL2 in response to the second control signal CLB. A phase of the second control signal CLB may be different from a phase of the first control signal CLA. In one or more embodiments, the second control signal CLB may be a signal in which the first control signal CLA is shifted by half a period of the first control signal CLA.

The first level shifter 161 may provide the first high-power clock signal HPCK1 and the second high-power clock signal HPCK2 to the first gate driver 121. The first level shifter 161 may generate the first high-power clock signal HPCK1 and the second high-power clock signal HPCK2 based on the first low gate voltage VGL1 and the high gate voltage VGH. Each of the first high-power clock signal HPCK1 and the second high-power clock signal HPCK2 may swing between the first low gate voltage VGL1 and the high gate voltage VGH.

The second level shifter 162 may provide the first low-power clock signal LPCK1, the second low-power clock signal LPCK2, and the gate start signal FLM to the first gate driver 121, and may provide the first control signal CLA and the second control signal CLB to the demultiplexer 150. The second level shifter 162 may generate the first low-power clock signal LPCK1, the second low-power clock signal LPCK2, the gate start signal FLM, the first control signal CLA, and the second control signal CLB based on the second low gate voltage VGL2 and the high gate voltage VGH. Each of the first low-power clock signal LPCK1, the second low-power clock signal LPCK2, the gate start signal FLM, the first control signal CLA, and the second control signal CLB may swing between the second low gate voltage VGL2 and the high gate voltage VGH.

Because the first low-power clock signal LPCK1 and the second low-power clock signal LPCK2 having relatively small amplitudes are provided to the first gate driver 121, power consumption of the first gate driver 121 may be reduced. Further, because the first control signal CLA and the second control signal CLB having relatively small amplitudes are provided to the demultiplexer 150, power consumption of the demultiplexer 150 may be reduced. As the power consumption of the first gate driver 121 and the power consumption of the demultiplexer 150 are reduced, power consumption of the display device 100 may be reduced.

The controller 170 may control an operation (or driving) of the first to fourth gate drivers 121, 122, 123, and 124, an operation (or driving) of the emission driver 130, and an operation (or driving) of the data driver 140. The controller 170 may output the gate control signal GCNT to the first to fourth gate drivers 121, 122, 123, and 124, may output the emission control signal ECNT to the emission driver 130, and may output the second image data IMD2 and the data control signal DONT to the data driver 140. The controller 170 may generate the gate control signal GCNT, the emission control signal ECNT, the second image data IMD2, and the data control signal DCNT based on first image data IMD1 and a controller control signal CTRL. The controller control signal CTRL may include a master clock signal, a vertical start signal, a horizontal start signal, an input data enable signal, etc.

Figure 13:
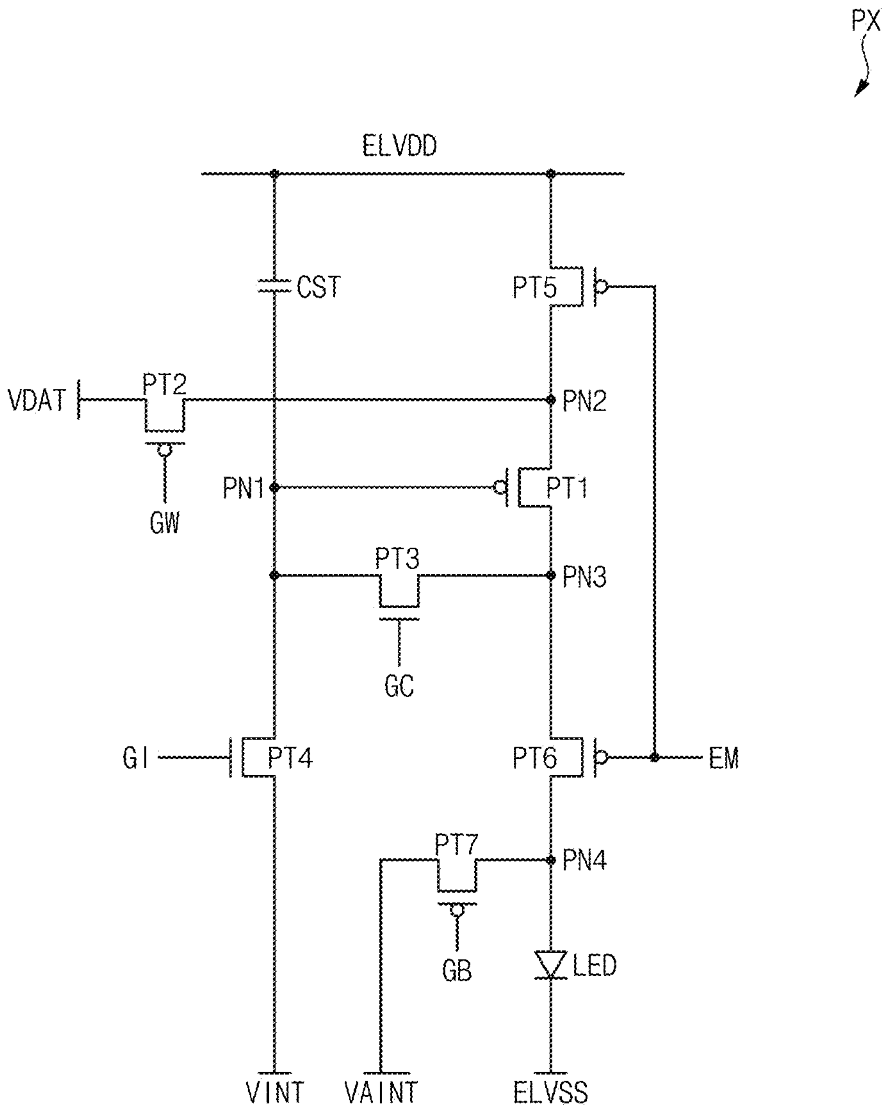
FIG. 13 is a circuit diagram showing an example of a pixel of FIG. 12.

FIG. 13 is a circuit diagram showing an example of a pixel PX of FIG. 12.

Referring to FIGS. 12 and 13, the pixel PX may receive the writing gate signal GW, the compensation gate signal GC, the initialization gate signal GI, the bypass gate signal GB, the emission signal EM, the data voltage VDAT, a first initialization voltage VINT, a second initialization voltage VAINT, a first power voltage ELVDD, and a second power voltage ELVSS.

The pixel PX may include a light-emitting element LED, a first pixel transistor PT1, a second pixel transistor PT2, a third pixel transistor PT3, a fourth pixel transistor PT4, a fifth pixel transistor PT5, a sixth pixel transistor PT6, a seventh pixel transistor PT7, and a storage capacitor CST.

The light-emitting element LED may emit light with a luminance corresponding to a driving current. The light-emitting element LED may include an anode connected to a fourth pixel node PN4, and a cathode that receives the second power voltage ELVSS.

The first pixel transistor PT1 may control the driving current that flows through the light-emitting element LED. The first pixel transistor PT1 may include a gate connected to a first pixel node PN1, a first terminal connected to a second pixel node PN2, and a second terminal connected to a third pixel node PN3. The first pixel transistor PT1 may be referred to as a driving transistor.

The second pixel transistor PT2 may transmit the data voltage VDAT to the gate of the first pixel transistor PT1 in response to the writing gate signal GW. The second pixel transistor PT2 may include a gate that receives the writing gate signal GW, a first terminal that receives the data voltage VDAT, and a second terminal connected to the second pixel node PN2. The second pixel transistor PT2 may be referred to as a writing transistor.

The third pixel transistor PT3 may compensate a threshold voltage of the first pixel transistor PT1 in response to the compensation gate signal GC. The third pixel transistor PT3 may include a gate that receives the compensation gate signal GC, a first terminal connected to the third pixel node PN3, and a second terminal connected to the first pixel node PN1. The third pixel transistor PT3 may be referred to as a compensation transistor.

The fourth pixel transistor PT4 may transmit the first initialization voltage VINT to the gate of the first pixel transistor PT1 in response to the initialization gate signal Gl. The fourth pixel transistor PT4 may include a gate that receives the initialization gate signal GI, a first terminal that receives the first initialization voltage VINT, and a second terminal connected to the first pixel node PN1. The fourth pixel transistor PT4 may be referred to as an initialization transistor.

The fifth pixel transistor PT5 may block a connection between the first terminal of the first pixel transistor PT1 and the first power voltage ELVDD in response to the emission signal EM. In one or more embodiments, the fifth pixel transistor PT5 may include a gate that receives the emission signal EM, a first terminal that receives the first power voltage ELVDD, and a second terminal connected to the second pixel node PN2. The fifth pixel transistor PT5 may be referred to as a first emission transistor.

The sixth pixel transistor PT6 may block a connection between the second terminal of the first pixel transistor PT1 and the second power voltage ELVSS in response to the emission signal EM. The sixth pixel transistor PT6 may include a gate that receives the emission signal EM, a first terminal connected to the third pixel node PN3, and a second terminal connected to the fourth pixel node PN4. The sixth pixel transistor PT6 may be referred to as a second emission transistor.

The seventh pixel transistor PT7 may transmit the second initialization voltage VAINT to the anode of the light-emitting element LED in response to the bypass gate signal GB. The seventh pixel transistor PT7 may include a gate that receives the bypass gate signal GB, a first terminal that receives the second initialization voltage VAINT, and a second terminal connected to the fourth pixel node PN4. The seventh pixel transistor PT7 may be referred to as a bypass transistor.

In one or more embodiments, each of the first pixel transistor PT1, the second pixel transistor PT2, the fifth pixel transistor PT5, the sixth pixel transistor PT6, and the seventh pixel transistor PT7 may be a PMOS transistor, and each of the third pixel transistor PT3 and the fourth pixel transistor PT4 may be an NMOS transistor. However, the present disclosure is not limited thereto, and in one or more other embodiments, at least one of the third pixel transistor PT3 or the fourth pixel transistor PT4 may be the PMOS transistor.

The storage capacitor CST may store a signal of the gate of the first pixel transistor PT1. The storage capacitor CST may include a first terminal connected to the first pixel node PN1, and a second terminal that receives the first power voltage ELVDD.

In one or more embodiments, the gate signal GS of FIG. 3, the gate signal GS of FIG. 9, and the gate signal GS of FIG. 11 may be the writing gate signal GW.

Figure 14:
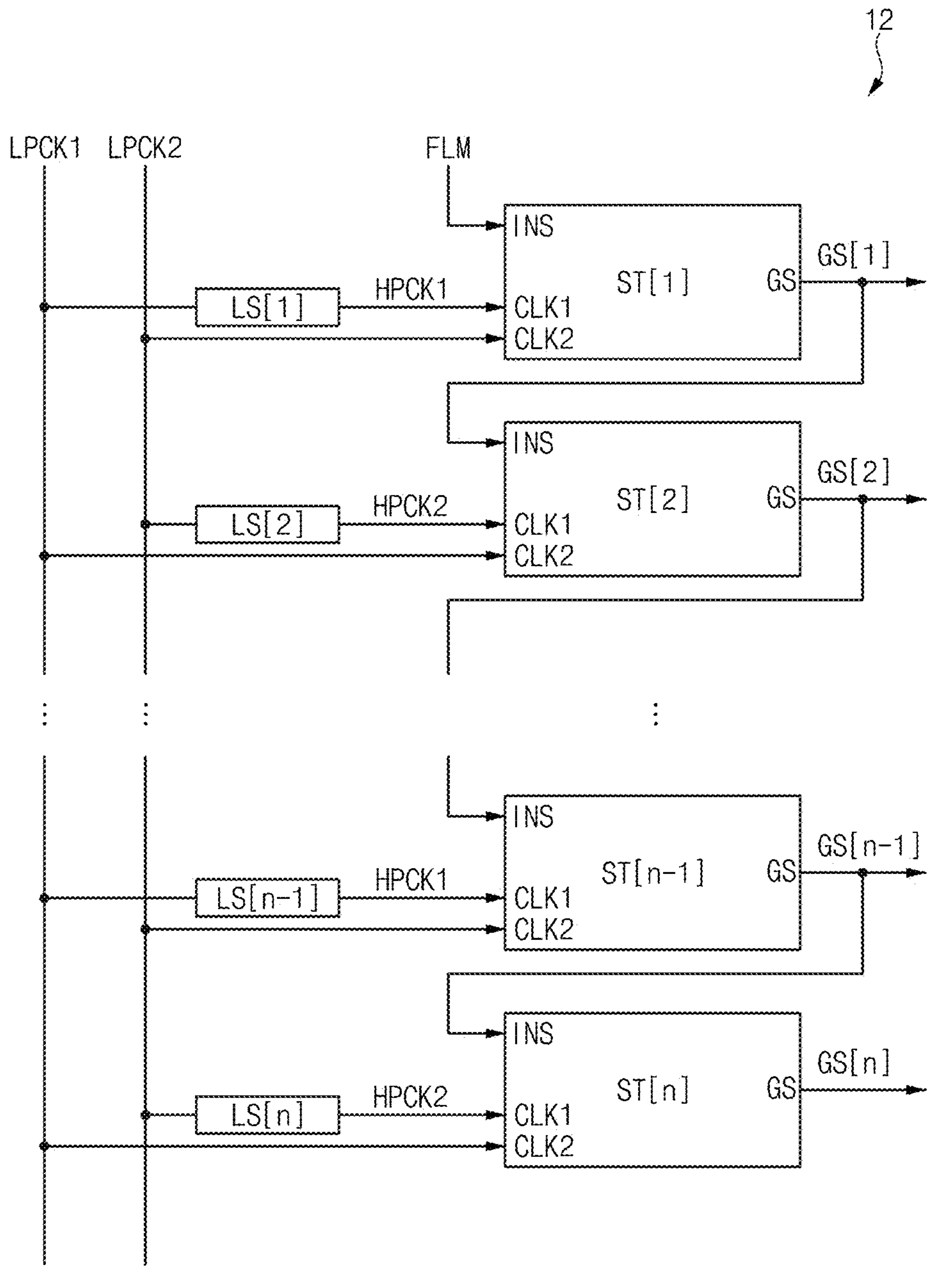
FIG. 14 is a block diagram showing a gate driver according to one or more embodiments.

FIG. 14 is a block diagram showing a gate driver 12 according to one or more embodiments.

Descriptions of components of the gate driver 12 described with reference to FIG. 14, which are substantially the same as or similar to those of the gate driver 10 described with reference to FIGS. 1 and 2, are omitted.

Referring to FIG. 14, the gate driver 12 may receive a first low-power clock signal LPCK1, a second low-power clock signal LPCK2, and a gate start signal FLM, and may output first to $n^{th}$ gate signals GS[1], GS[2], . . . , GS[n−1], and GS[n]. The gate driver 12 may include first to $n^{th}$ stages ST[1], ST[2], . . . , ST[n−1], and ST[n] and first to $n^{th}$ level shifters LS[1], LS[2], . . . , LS[n−1], and LS[n].

Each of the first to $n^{th}$ level shifters LS[1], LS[2], . . . , LS[n−1], and LS[n] may receive the first low-power clock signal LPCK1 or the second low-power clock signal LPCK2, and may output a first high-power clock signal HPCK1 or a second high-power clock signal HPCK2. In one or more embodiments, each of the odd-numbered level shifters LS[1], . . . , LS[n−1] may receive the first low-power clock signal LPCK1, and may output the first high-power clock signal HPCK1. Further, each of the even-numbered level shifters LS[2], . . . , LS[n] may receive the second low-power clock signal LPCK2, and may output the second high-power clock signal HPCK2. The odd-numbered level shifters LS[1], . . . , LS[n−1] may provide the first high-power clock signal HPCK1 to odd-numbered stages ST[1], . . . , ST[n−1], and the even-numbered level shifters LS[2], . . . , LS[n] may provide the second high-power clock signal HPCK2 to even-numbered stages ST[2], . . . , ST[n].

Figure 15:
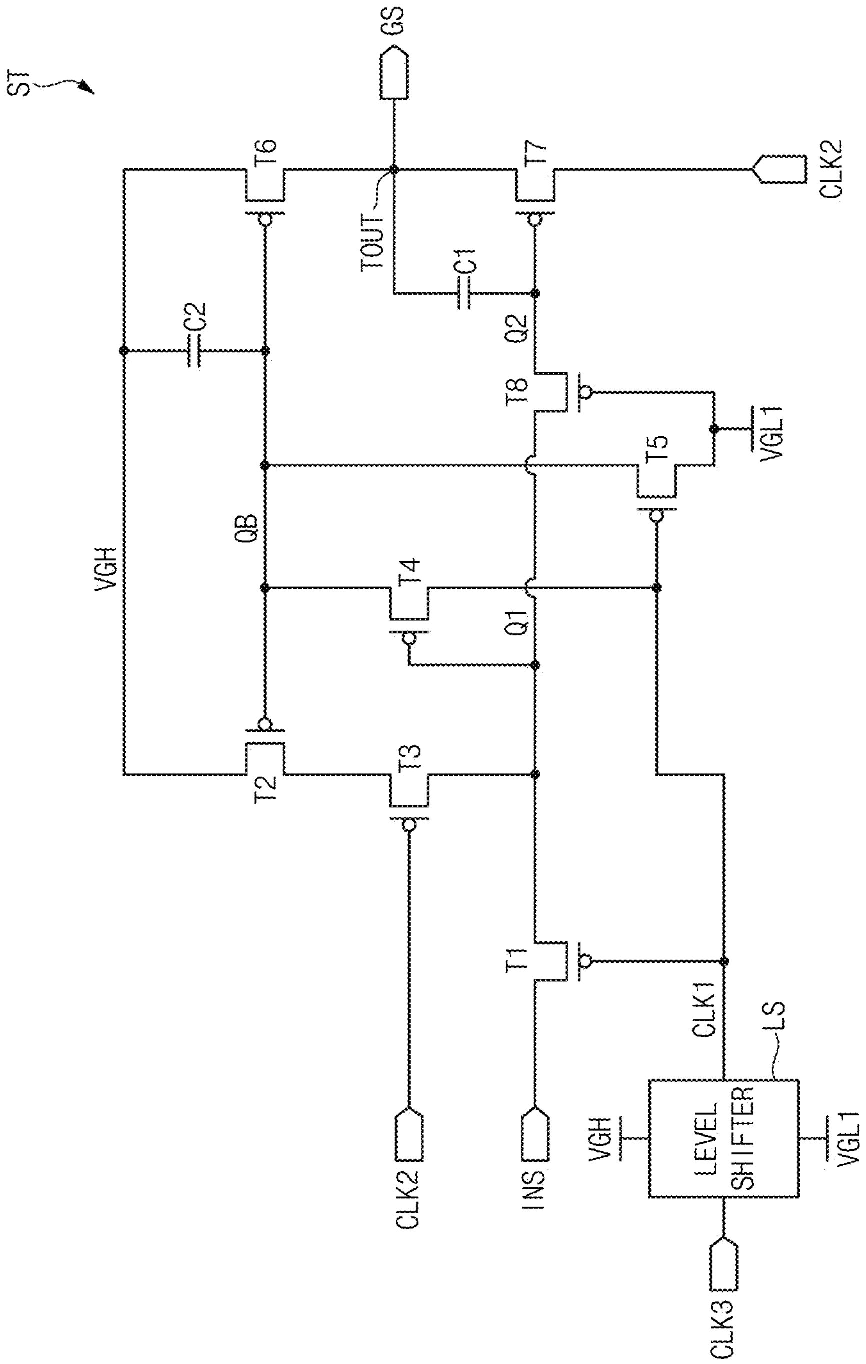
FIG. 15 is a circuit diagram showing an example of a stage and a level shifter of FIG. 14.

FIG. 15 is a circuit diagram showing an example of a stage ST and a level shifter LS of FIG. 14.

Descriptions of components of the stage ST described with reference to FIG. 15, which are substantially the same as or similar to those of the stage ST described with reference to FIGS. 3 and 9, are omitted.

Referring to FIG. 15, the stage ST may include a first transistor T1, a second transistor T2, a third transistor T3, a fourth transistor T4, a fifth transistor T5, a sixth transistor T6, a seventh transistor T7, an eighth transistor T8, a first capacitor C1, and a second capacitor C2.

The level shifter LS may convert the third clock signal CLK3 that swings between the second low gate voltage VGL2 and the high gate voltage VGH into the first clock signal CLK1. The third clock signal CLK3 may be the first low-power clock signal LPCK1 when the level shifter LS is one of the odd-numbered level shifters LS[1], . . . , LS[n−1], and the third clock signal CLK3 may be the second low-power clock signal LPCK2 when the level shifter LS is one of the even-numbered level shifters LS[2], . . . , LS[n].

Figure 16:
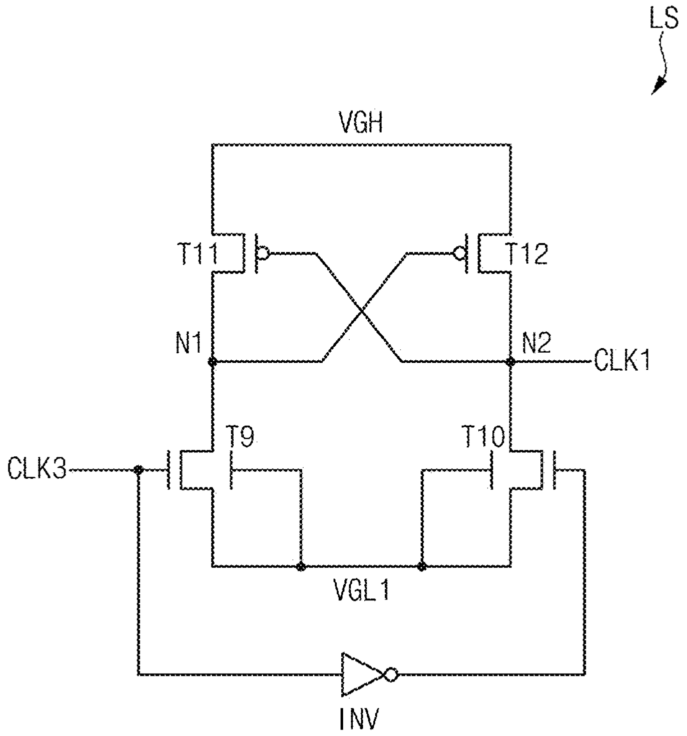
FIG. 16 is a circuit diagram showing an example of the level shifter of FIG. 15.
Figure 17:
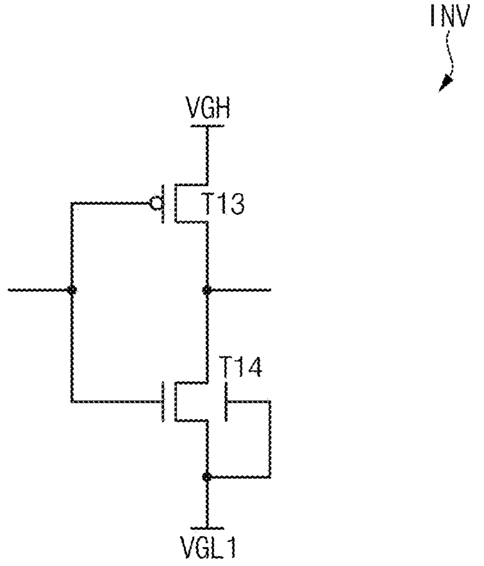
FIG. 17 is a circuit diagram showing an example of an inverter of FIG. 16.

FIG. 16 is a circuit diagram showing an example of the level shifter LS of FIG. 15. FIG. 17 is a circuit diagram showing an example of an inverter INV of FIG. 16.

Referring to FIGS. 16 and 17, the level shifter LS may include a ninth transistor T9, a tenth transistor T10, an eleventh transistor T11, a twelfth transistor T12, and an inverter INV.

The ninth transistor T9 may include a gate that receives the third clock signal CLK3, a first terminal that receives the first low gate voltage VGL1, and a second terminal connected to a first node N1. In one or more embodiments, the ninth transistor T9 may further include a back gate that receives the first low gate voltage VGL1.

The tenth transistor T10 may include a gate, a first terminal that receives the first low gate voltage VGL1, and a second terminal connected to a second node N2 that outputs the first clock signal CLK1. In one or more embodiments, the tenth transistor T10 may further include a back gate that receives the first low gate voltage VGL1.

The eleventh transistor T11 may include a gate connected to the second node N2, a first terminal that receives the high gate voltage VGH, and a second terminal connected to the first node N1.

The twelfth transistor T12 may include a gate connected to the first node N1, a first terminal that receives the high gate voltage VGH, and a second terminal connected to the second node N2.

In one or more embodiments, each of the ninth transistor T9 and the tenth transistor T10 may be an NMOS transistor, and each of the eleventh transistor T11 and the twelfth transistor T12 may be a PMOS transistor.

The inverter INV may include a first terminal that receives the third clock signal CLK3, and a second terminal connected to the gate of the tenth transistor T10. The inverter INV may include a thirteenth transistor T13 and a fourteenth transistor T14. The thirteenth transistor T13 may include a gate that receives the third clock signal CLK3, a first terminal that receives the high gate voltage VGH, and a second terminal connected to the gate of the tenth transistor T10. The fourteenth transistor T14 may include a gate that receives the third clock signal CLK3, a first terminal that receives the first low gate voltage VGL1, and a second terminal connected to the gate of the tenth transistor T10. In one or more embodiments, the fourteenth transistor T14 may further include a back gate that receives the first low gate voltage VGL1.

In one or more embodiments, the thirteenth transistor T13 may be a PMOS transistor and the fourteenth transistor T14 may be an NMOS transistor.

Figure 18:
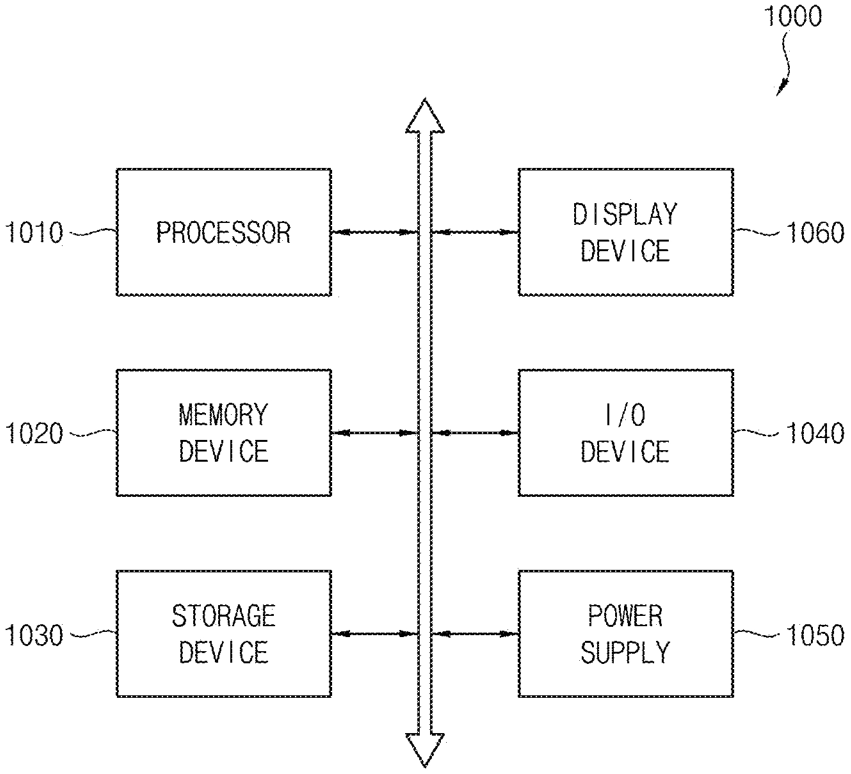
FIG. 18 is a block diagram showing an electronic apparatus according to one or more embodiments.

FIG. 18 is a block diagram showing an electronic apparatus according to one or more embodiments.

Referring to FIG. 18, the electronic apparatus 1000 may include a processor 1010, a memory device 1020, a storage device 1030, an input/output (I/O) device 1040, a power supply 1050, and a display device 1060. The electronic apparatus 1000 may further include a plurality of ports capable of communicating with a video card, a sound card, a memory card, a USB device, and the like, or communicating with other systems.

The processor 1010 may perform specific calculations or tasks. According to one or more embodiments, the processor 1010 may be a microprocessor, a central processing unit (CPU), or the like. The processor 1010 may be connected to other components through an address bus, a control bus, a data bus, and the like. According to one or more embodiments, the processor 1010 may also be connected to an expansion bus such as a peripheral component interconnect (PCI) bus.

The processor 1010 may control the display device 1060. In one or more embodiments, the processor 1010 may provide the first image data IMD1 of FIG. 12 and the controller control signal CTRL of FIG. 12 to the display device 1060.

The memory device 1020 may store data required for an operation of the electronic apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may supply a power required for the operation of the electronic apparatus 1000. The display device 1060 may be connected to other components through the buses or other communication links. The display device 1060 may correspond to the display device 100 of FIG. 12.

In a gate driver included in the display device 1060, a level of a second gate voltage of a second clock signal, which is applied to a seventh transistor that is a buffer transistor for outputting a gate signal, is higher than a level of a first low gate voltage of a first clock signal, so that an amplitude of the second clock signal may decrease. Accordingly, power consumption of the gate driver may be reduced. Further, the display device 1060 includes the gate driver with the reduced power consumption, so that power consumption of the display device 1060 may be reduced.

The display device according to one or more embodiments is a device for displaying a video or still image, and may be used as a display screen for various products, such as television, laptops, monitors, billboards, Internet of Things (IoTs), as well as portable electronic devices, such as mobile phone, smart phone, smart pad, tablet personal computer (PC), mobile communication terminal, electronic notebook, electronic book, portable multimedia player PMP, personal digital assistant PDA, MP3 player, navigation system, and ultra mobile PC UMPC. In addition, the display device according to one or more embodiments may be used in wearable devices, such as smart watches, watch phones, glasses-type displays, head-mounted displays HMDs, virtual reality (VR) devices, or augmented reality (AR) devices. In addition, the display device according to one or more embodiments may be used as a dashboard of a vehicle, a center information display (CID) located in a center fascia or a dashboard of the vehicle, a room mirror display replacing a side mirror of the vehicle, an entertainment element for a rear seat of the vehicle, and a display located on a rear surface of the front seat.

Although the gate driver, the display device, and the electronic apparatus according to the embodiments have been described with reference to the drawings, the illustrated embodiments are examples, and may be modified and changed by a person having ordinary knowledge in the relevant technical field without departing from the technical spirit described in the following claims, with functional equivalents thereof to be included therein.

What is claimed is:

1. A gate driver, comprising:

a first transistor configured to transmit an input signal to a control node in response to a first clock signal swinging between a first low gate voltage and a high gate voltage;

a sixth transistor configured to output the high gate voltage as a gate signal to an output terminal in response to a signal of an inverting control node; and a seventh transistor configured to output a second clock signal swinging between a second low gate voltage, which has a level that is higher than a level of the first low gate voltage, and the high gate voltage as the gate signal to the output terminal in response to a signal of the control node.

2. The gate driver of claim 1, wherein a phase of the second clock signal is different from a phase of the first clock signal.

3. The gate driver of claim 1, wherein the level of the second low gate voltage is lower than or equal to about 0 V.

4. The gate driver of claim 1, wherein a width of a pulse of the first clock signal having the level of the first low gate voltage is greater than a width of a pulse of the second clock signal having the level of the second low gate voltage.

5. The gate driver of claim 1, further comprising:

a second transistor comprising a gate connected to the inverting control node, a first terminal configured to receive the high gate voltage, and a second terminal; and a third transistor comprising a gate configured to receive the second clock signal, a first terminal connected to the second terminal of the second transistor, and a second terminal connected to the control node.

6. The gate driver of claim 1, further comprising a fourth transistor configured to transmit the first clock signal to the inverting control node in response to the signal of the control node.

7. The gate driver of claim 1, further comprising a fourth transistor configured to transmit a third clock signal swinging between the second low gate voltage and the high gate voltage to the inverting control node in response to the signal of the control node.

8. The gate driver of claim 7, wherein a phase of the third clock signal is the same as a phase of the first clock signal.

9. The gate driver of claim 1, further comprising a fifth transistor configured to transmit the first low gate voltage to the inverting control node in response to the first clock signal.

10. The gate driver of claim 1, further comprising a first capacitor comprising a first terminal connected to the output terminal, and a second terminal connected to the control node.

11. The gate driver of claim 1, further comprising a second capacitor comprising a first terminal connected to the inverting control node, and a second terminal configured to receive the high gate voltage.

12. The gate driver of claim 1, further comprising:

a first control node and a second control node as the control node; and an eighth transistor comprising a gate configured to receive the first low gate voltage, a first terminal connected to the first control node, and a second terminal connected to the second control node.

13. The gate driver of claim 1, further comprising a level shifter configured to convert a third clock signal swinging between the second low gate voltage and the high gate voltage into the first clock signal.

14. The gate driver of claim 13, wherein the level shifter comprises:

a ninth transistor comprising a gate configured to receive the third clock signal, a first terminal configured to receive the first low gate voltage, and a second terminal connected to a first node;

a tenth transistor comprising a gate, a first terminal configured to receive the first low gate voltage, and a second terminal connected to a second node configured to output the first clock signal;

an eleventh transistor comprising a gate connected to the second node, a first terminal configured to receive the high gate voltage, and a second terminal connected to the first node;

a twelfth transistor comprising a gate connected to the first node, a first terminal configured to receive the high gate voltage, and a second terminal connected to the second node; and an inverter comprising a first terminal configured to receive the third clock signal, and a second terminal connected to the gate of the tenth transistor.

15. A display device comprising:

a display panel comprising a pixel;

a gate driver configured to provide a gate signal to the pixel, and comprising:

a first transistor configured to transmit an input signal to a control node in response to a first clock signal swinging between a first low gate voltage and a high gate voltage;

a sixth transistor configured to output the high gate voltage as the gate signal to an output terminal in response to a signal of an inverting control node; and a seventh transistor configured to output a second clock signal swinging between a second low gate voltage, which has a level that is higher than a level of the first low gate voltage, and the high gate voltage as the gate signal to the output terminal in response to a signal of the control node; and a data driver configured to provide a data voltage to the pixel.

16. The display device of claim 15, further comprising a demultiplexer configured to selectively connect one channel of the data driver to data lines in the display panel in response to a control signal.

17. The display device of claim 16, further comprising:

a first level shifter configured to generate the first clock signal based on the first low gate voltage and the high gate voltage; and a second level shifter configured to generate the second clock signal and the control signal based on the second low gate voltage and the high gate voltage.

18. The display device of claim 15, wherein the pixel comprises:

a light-emitting element;

a first pixel transistor configured to control a driving current flowing through the light-emitting element;

a second pixel transistor configured to transmit the data voltage to a gate of the first pixel transistor in response to a writing gate signal;

a third pixel transistor configured to compensate a threshold voltage of the first pixel transistor in response to a compensation gate signal;

a fourth pixel transistor configured to transmit a first initialization voltage to the gate of the first pixel transistor in response to an initialization gate signal;

a fifth pixel transistor configured to block a connection between a first terminal of the first pixel transistor and a first power voltage in response to an emission signal;

a sixth pixel transistor configured to block a connection between a second terminal of the first pixel transistor and a second power voltage in response to the emission signal;

a seventh pixel transistor configured to transmit a second initialization voltage to an anode of the light-emitting element in response to a bypass gate signal; and a storage capacitor configured to store a signal of the gate of the first pixel transistor.

19. The display device of claim 18, wherein the gate signal is the writing gate signal.

20. An electronic apparatus comprising a display device configured to display an image, and a processor configured to control the display device, the display device comprising:

a display panel comprising a pixel;

a gate driver configured to provide a gate signal to the pixel, and comprising:

a first transistor configured to transmit an input signal to a control node in response to a first clock signal swinging between a first low gate voltage and a high gate voltage;

a sixth transistor configured to output the high gate voltage as the gate signal to an output terminal in response to a signal of an inverting control node; and a seventh transistor configured to output a second clock signal swinging between a second low gate voltage, which has a level that is higher than a level of the first low gate voltage, and the high gate voltage as the gate signal to the output terminal in response to a signal of the control node; and a data driver configured to provide a data voltage to the pixel.

* * * * *